Dec. 4, 1934.  C. E. KRAUS  1,982,958
VARIABLE PUMP
Filed June 14, 1933   2 Sheets-Sheet 1

Inventor
Charles E. Kraus
By
Attorneys

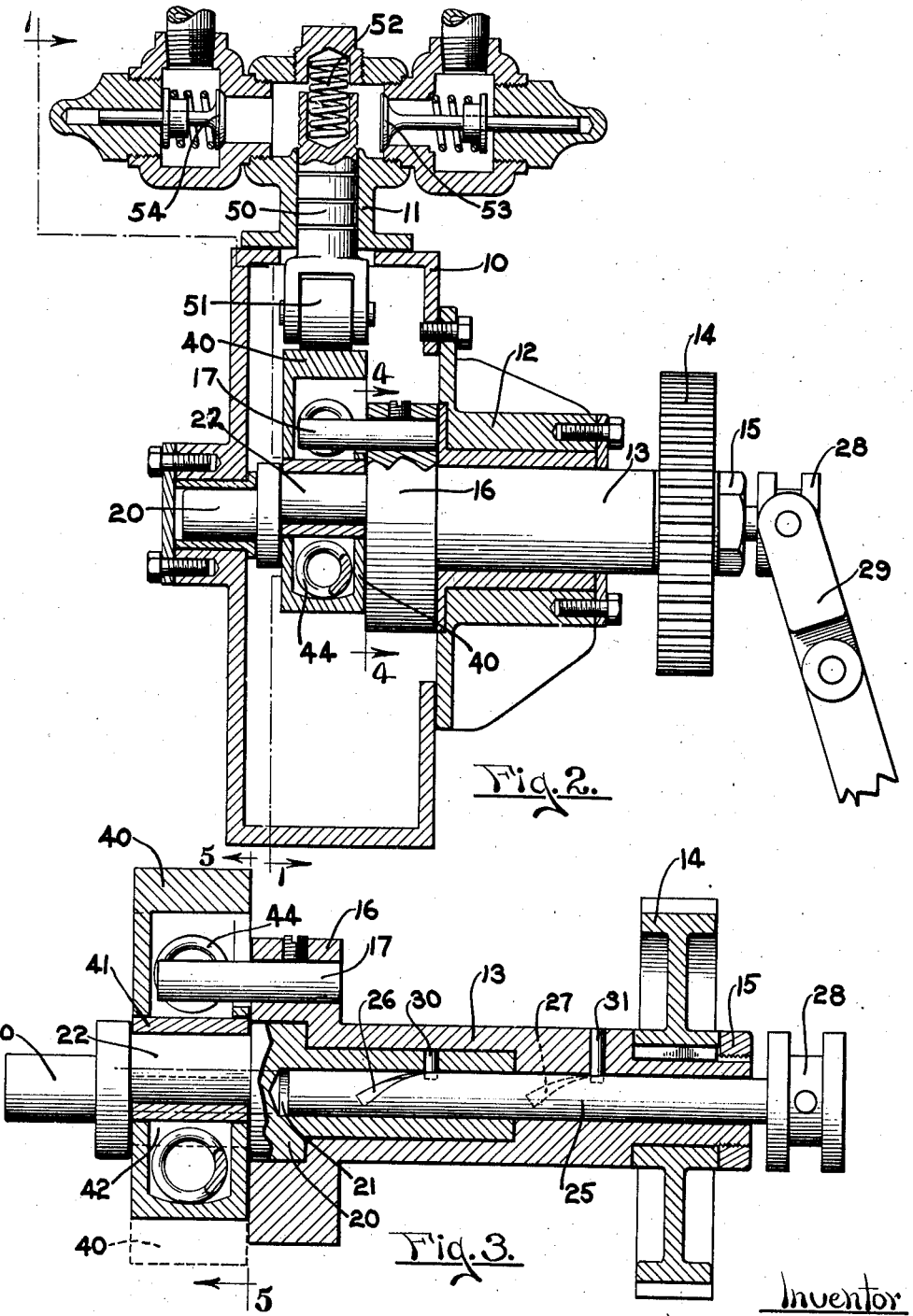

Patented Dec. 4, 1934

1,982,958

UNITED STATES PATENT OFFICE 1,982,958

VARIABLE PUMP

Charles E. Kraus, Ann Arbor, Mich.

Application June 14, 1933, Serial No. 675,672

8 Claims. (Cl. 74—571)

This invention relates generally to a power transmitting device and more particularly to a variable torque responsive driving means for a series of radially positioned spaced units, such as pump plungers or the like.

Briefly described, my invention consists of a driven shaft having an adjustable crank extending therefrom, and a cam disc yieldably and adjustably mounted upon said crank, the cam disc intermittently driving a series of radially spaced units or plungers. The radially spaced units are pushed outwardly by the cam and are provided with spring means for their return movement.

One of the main features of my invention resides in the yieldable connection between the cam disc and its supporting crank whereby excessive resistance of the several plungers to outward movement causes compression of the yieldable connection thereby diminishing the eccentricity of the cam disc and this reduces the load on the prime mover which is driving the main driving shaft. In other words, if a fluid is being pumped by the several plungers against a certain pressure head, and then the pressure head is increased, the prime mover may still operate at the same speed and horse power inasmuch as the spring, by predetermined construction, permits a lessening of the cam disc's action and consequently the reciprocating movements of the several plungers are automatically reduced. Thus an automatic regulation is obtained.

Another primary advantage resides in my novel manual adjusting means whereby the crank pin is mounted upon the revoluble shaft, the shaft being connected to the cam disk in a unique manner as will later be fully described.

Other objects and advantages reside in the special construction, combination and arrangement of the various elements forming the invention as more fully hereinafter described and claimed, reference being had to the accompanying drawings forming part thereof, wherein.

Fig. 2 is a vertical longitudinal section taken along the line 2—2 of Fig. 1.

Fig. 3 is a vertical longitudinal section through the driving parts showing the automatic and manual means for the adjustment of the cam disc.

Similar numerals refer to similar parts throughout the several views.

Figure 1:
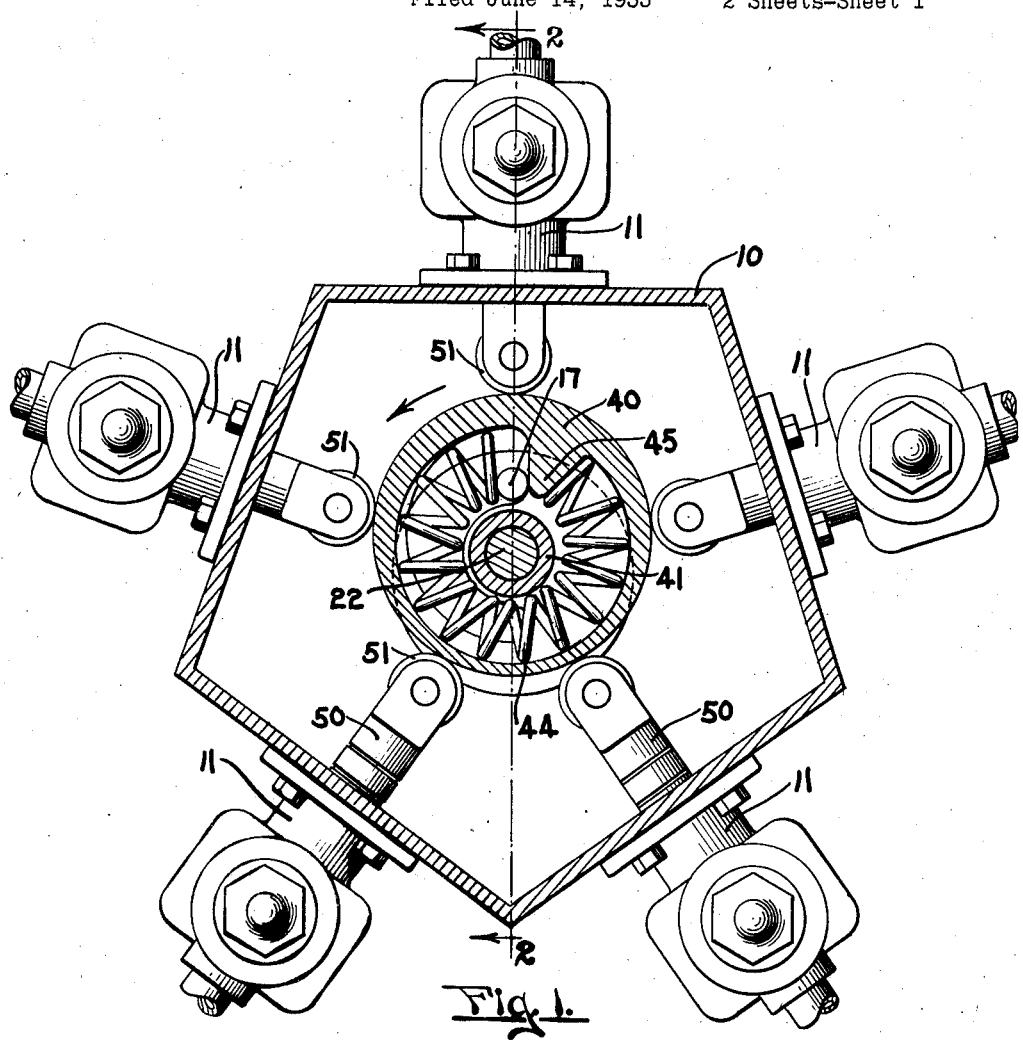
Fig. 1 is a vertical cross section taken along the line 1—1 of Fig. 2 looking in the direction of the arrows, this view showing my invention applied to a pump construction.
Figure 4:
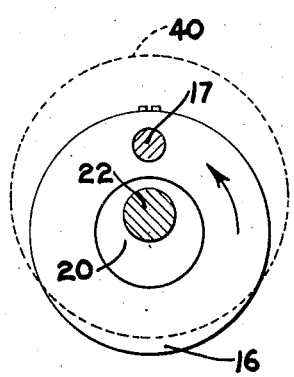
Fig. 4 is a vertical section taken along the line 4—4 of Fig. 2, looking in the direction of the arrows, showing the driving head, the driving pin therefor, and the crank in section, with the cam disc superimposed upon the figure in dotted lines.

Referring to the drawings, numeral 10 indicates a casing having a plurality of flat sides adapted to receive the cylinders 11 thereagainst. The casing or housing 10 removably receives the journal member 12 thereagainst, see Fig. 2, this journal member revolubly receiving the main driving shaft 13, a gear 14 being rigidly keyed to the driving shaft whereby the same may be driven. A nut 15 is threaded onto one end of the shaft and aids in locking the gear 14 thereon.

At the other end of the shaft, an integral enlarged head 16 is formed, this head being of cylindrical shape and removably receiving the pin 17 therein, the purpose of this pin to be described later.

The driving shaft 13 is recessed to a plurality of different diameters as clearly shown in Fig. 3 of the drawings and a hollow sleeve member 20 recessed at 21 and having a crank or crank pin 22 revolubly mounted within the driving shaft.

A rod member 25, having oppositely extending helical grooves 26 and 27, is mounted for axial movement in the recess 21 of the sleeve 20 and the recess within the driving shaft 13. A spool 28 is fastened to the outer end of the rod 25 and a lever 29 provides means for manual adjustment of the rod axially. Pins 30 and 31 extend inwardly from the members 20 and 13, respectively, and ride in the grooves 26 and 27 respectively.

From the above construction, it will be seen that operation of the lever 29 moves the rod 25 axially and thereby causes rotation of the crank 22 with respect to the driving shaft 13.

Figure 5:
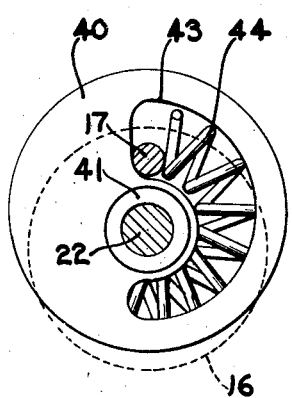
Fig. 5 is a vertical cross section taken along the line 5—5 of Fig. 3, looking in the direction of the arrows, showing the face of the cam disc and means whereby the cam disc is yieldably driven by means of a driving pin mounted upon the driving head, this driving head being shown in dotted lines.
Figure 6:
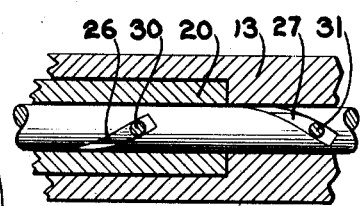
Fig. 6 is a fragmentary vertical longitudinal section showing the adjusting rod, the adjacent parts, the helical grooves in said rod and the pins in cross section, such pins operating in conjunction with the rod whereby longitudinal movement of the rod adjusts the eccentricity of the cam disc.

A cam or cam disc 40 has a bearing 41 eccentrically located therein, see Figs. 3 and 5 and is revolubly mounted upon the crank or crank pin 22. The cam disc 40 is also recessed as indicated at 42 and an arcuate shaped opening 43, see Fig. 5, is formed therein. A coiled spring 44 is received within the recess 42, one end of the spring abutting against the member 45 and the other end of the spring riding against the pin 17, previously referred to. The direction of rotation of the driving shaft is such as to tend to cause compression of the spring 44.

Each of the cylinders 11 receives a piston 50 therein. Rollers 51 are mounted at the inner ends of the several pistons and ride against the exterior surface of the cam disc. Springs 52 move the pistons 50 inwardly against the cam disc at all times and thereby cause reciprocation of the pistons to a greater or less degree depending upon the adjustment of the cam disc. Inlet and outlet valves, 53 and 54, respectively, are provided, see Fig. 1, these operating in a well known manner.

The operation

The gear 14 is driven by any desired prime mover and transmits rotation to the driving shaft 13, the head 16 and the pin 17. The pin 17 transmits force against the spring 44 which rides against the abutment 45 and causes movement of the cam disc 40 about the axis of the driving shaft 13.

The cam disc 40 is manually adjusted to the desired position and as the driving shaft 13 revolves the cam disc pushes the pistons 50 outwardly one after the other, the springs 52 causing their inward movement, there being one complete reciprocation of each piston for each revolution of the driving shaft. Should the resistance of the pistons 50 be increased for any reason, the cam disc 40 will tend to rotate in a direction reverse to its driving movement and this will cause the spring 44 to compress somewhat and will also cause movement between the cam disc 40 and the driving shaft 13 whereby the cam disc 40 will more nearly approach a concentric position, such movement causing a decrease in the travel of the several pistons 50 and thereby reducing the work. Therefore, the load on the prime mover will remain substantially the same. Thus a torque responsive device is obtained.

Having thus revealed this invention, I claim as new and desire to secure the following combinations and elements, or equivalents thereof, by Letters Patent of the United States.

1. In a device of the character described, a revoluble shaft, a crank, means for mounting said crank eccentrically on said shaft, a cam disc mounted upon said crank, in eccentric manner with respect thereto, a pin extending from said shaft, said cam disc having a slot to receive the said pin, said slot having a radial width at one end greater than the degree of eccentricity of the crank with respect to the said shaft and said slot extending arcuately in the cam disc and spring means for maintaining the pin at the large end of the said slot for the purpose described.

2. In a construction of the class described, a hollow revolubly mounted shaft, a sleeve member having a crank extending therefrom, said sleeve member being revolubly mounted in the hollow portion of said shaft, a cam member comprising a disc having an eccentrically located hole therein, said hole receiving the crank, connecting means between the shaft and the said disc whereby radial movement therebetween is permitted and whereby yielding movement therebetween is also permitted, means for rotating said sleeve member relative to said hollow shaft, and means driven by the said cam for the purpose described.

3. In combination, a revolubly mounted hollow shaft, a hollow sleeve member having a crank extending therefrom and mounted in one end of said shaft, a rod revolubly mounted in said other end of the said shaft and also extending into the sleeve member, means interconnecting the rod and the said sleeve and additional means interconnecting the rod and the said shaft whereby longitudinal movement of the rod causes opposite rotational movement of these two members, a cam member mounted upon said crank, and means connecting the said cam member and the shaft.

4. A combination of elements as set forth in claim 3, in which said last mentioned means include a spring connection whereby a yielding lost motion connection is permitted between the cam member and the said hollow shaft.

5. In combination, a shaft, means for revolubly mounting said shaft, said shaft being hollowed out to form two cylindrical portions of different diameters, a sleeve member mounted in the larger of these portions and having a crank pin extending beyond the end of the said shaft and having a hollowed out portion of substantially the same diameter as the smaller hollowed out portion of the said shaft, a rod member mounted in the said sleeve and the said shaft, said rod member having oppositely extending helical grooves, one of these grooves being located in the said sleeve and the other being located in the said shaft, means extending from the said sleeve into the first mentioned groove, additional means extending from the said shaft into the said second mentioned groove, means for moving the rod longitudinally whereby the said shaft and the said sleeve are simultaneously rotated in opposite directions, a cam disc eccentrically mounted upon the said crank, said cam disc having a slot therein, a pin mounted upon said shaft and extending into said slot and spring means for maintaining the said pin against one e 1 of said slot and means for rotating the said shaft in either direction.

6. In a device of the character described, a shaft, means for revolubly mounting the same, a crank extending from the shaft, means for mounting said crank eccentrically with respect to said shaft, a cam disc mounted upon said crank, in eccentric manner with respect thereto, rigid means extending from said shaft, stop means on the cam disc and spring means located between the stop means and the rigid means, said connection between the rigid means and the spring moving radially in proportion to the compression of the spring.

7. In a device of the character described, a revoluble shaft, a crank extending from one end of said shaft, means for mounting said crank eccentrically with respect to said shaft, a cam disc mounted upon said crank, in eccentric manner with respect thereto, a pin extending from said shaft, said cam disc having a slot to receive the said pin, said slot having a radial width at one end equal to the degree of eccentricity of the crank with respect to the said shaft and said slot extending arcuately in the cam disc and spring means for maintaining the pin at the large end of the said slot for the purpose described.

8. In a device of the class described, a revoluble shaft, a crank extending from the said shaft, means for mounting the crank eccentrically of said shaft, means for varying the circumferential position of the crank, a cam disc eccentrically and revolubly mounted on said crank, means between the shaft and the cam disc for yieldably revolving said cam disc on revolution of said shaft and means driven by said cam for the purpose described.

CHARLES E. KRAUS.